United States Patent [19]

Staib et al.

[11] Patent Number: 5,542,755
[45] Date of Patent: Aug. 6, 1996

[54] ELECTROMAGNETICALLY ACTUATABLE VALVE FOR A HYDRAULIC BRAKE SYSTEM

[75] Inventors: Helmut Staib, Schwieberdingen; Michael Friedow, Tamm, both of Germany

[73] Assignee: Robert Bosch GmbH, Stuttgart, Germany

[21] Appl. No.: 333,182

[22] Filed: Nov. 2, 1994

[30] Foreign Application Priority Data

Nov. 3, 1993 [DE] Germany .......................... 43 37 435.2

[51] Int. Cl.[6] .............................. B60T 8/36; F16K 31/06
[52] U.S. Cl. ...................... 303/119.2; 335/262; 303/900
[58] Field of Search ............................ 303/119.2, 119.1, 303/900, 901; 335/202, 229, 262, 269; 251/129.01, 129.15, 129.16, 129.22; 137/596.17

[56] References Cited

U.S. PATENT DOCUMENTS

| | | |
|---|---|---|
| 4,656,448 | 4/1987 | Luetzow . |
| 4,875,742 | 10/1989 | Hawker ................................. 303/119.2 |
| 5,335,984 | 8/1994 | Alaze et al. .......................... 303/119.2 |
| 5,388,899 | 2/1995 | Volz et al. ............................ 303/119.2 |

FOREIGN PATENT DOCUMENTS

| | | |
|---|---|---|
| 0272511 | 6/1988 | European Pat. Off. . |
| 3810581 | 10/1989 | Germany ............................ 303/119.2 |
| 4202389 | 8/1993 | Germany . |

*Primary Examiner*—Douglas C. Butler
*Attorney, Agent, or Firm*—Edwin E. Greigg; Ronald E. Greigg

[57] ABSTRACT

An electromagnetically controllable valve has among other elements a guide sleeve that protrudes into a valve block, with an armature and a closing member movable inside the guide sleeve relative to a valve seat. The guide sleeve extends through a securing flange, which is inserted into a receiving bore, located on the valve block, and is fixed there. To secure the guide sleeve against shifting out of the valve block and the securing flange, the guide sleeve is provided with a radially outward-oriented bead. This bead extends within a region, for example an annular recess, that is associated with the securing flange. By way of the recess and the bead, the guide sleeve is axially fixed essentially form-lockingly and inexpensively. The electromagnetically actuatable valve can be built into traction-controlled brake systems of motor vehicles in order to vary brake pressures in the anti-lock and/or traction control modes.

6 Claims, 4 Drawing Sheets

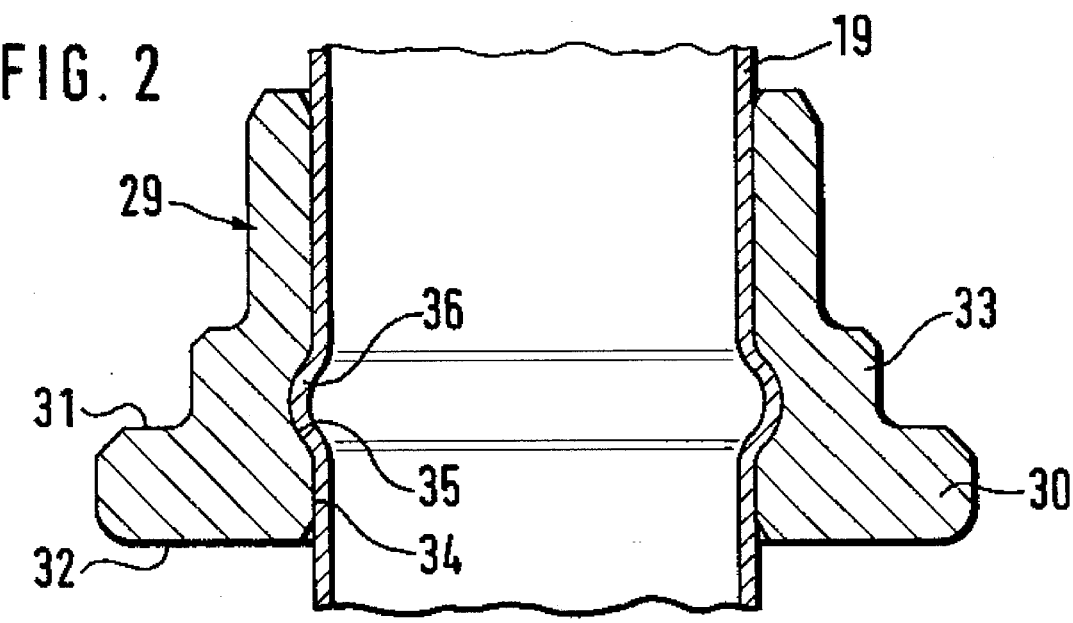
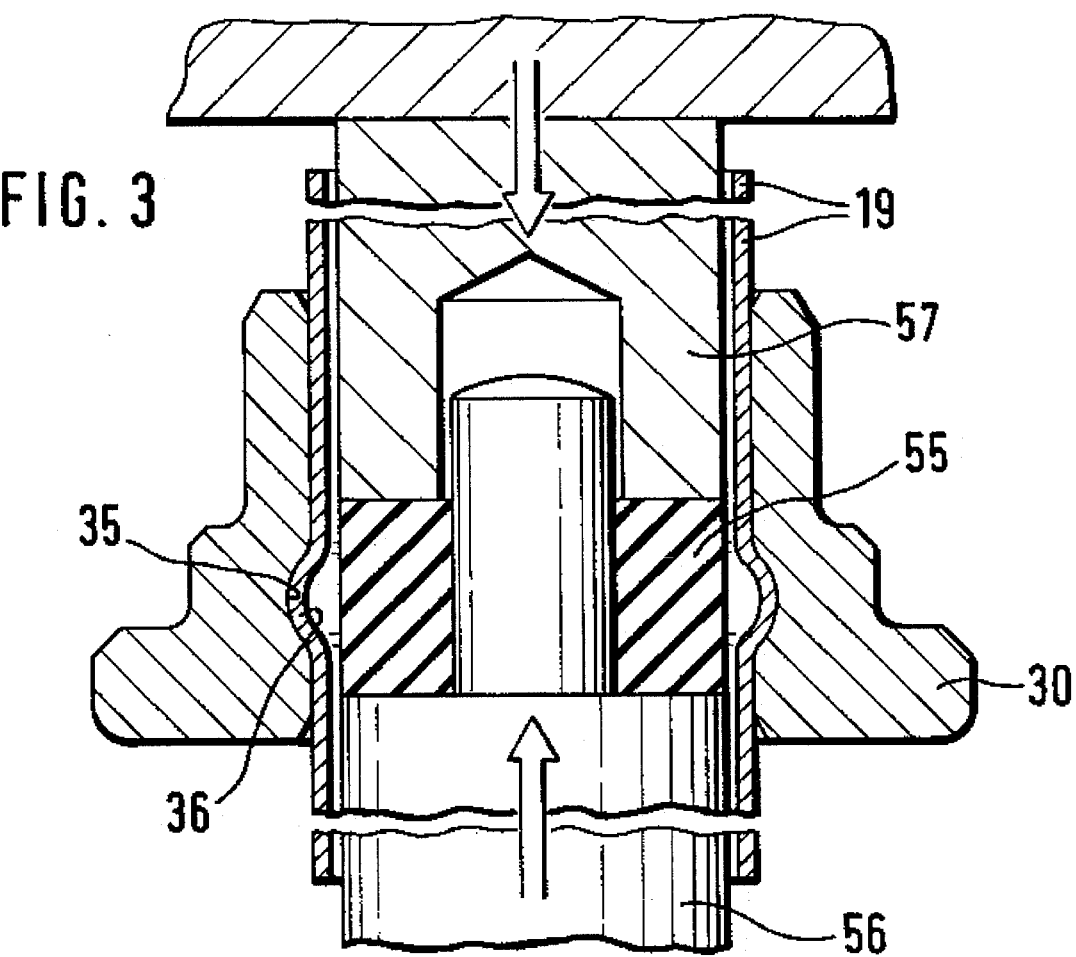

ELECTROMAGNETICALLY ACTUATABLE VALVE FOR A HYDRAULIC BRAKE SYSTEM

BACKGROUND OF THE INVENTION

The invention is based on an electromagnetically actuatable valve, for a traction-controlled hydraulic brake system of a motor vehicle.

German Patent Disclosure DE 42 02 389 A1, now U.S. Pat. No. 5,335,984, discloses a hydraulic traction-controlled brake system for a motor vehicle that has a plurality of electromagnetically actuatable valves, used in a valve block of a hydraulic unit, for varying the brake pressures, especially when there is a danger of wheel locking. Such a valve has a thin-walled guide sleeve, inside which a magnet core and a valve seat are secured and in which an armature and a closing member are movably disposed. For electromagnetic actuation of this valve, an electrical coil is provided outside the guide sleeve; a soft magnetic housing fits over it, and a fastening flange through whose opening the guide sleeve protrudes is combined with the housing and inserted into a receiving bore of the valve block and fixed, using a plastically deformable fastener element. The fastener element, which is essentially tubular in its original state, is pressed in between a securing rim formed onto the housing and bordering on the securing flange, and an undercut in the receiving bore. In U.S. Pat. No. 5,335,984, a radial play is shown between the guide sleeve and the opening of the securing flange, so that forces acting in the direction of the atmosphere as a consequence of pressure imposition from the valve block have to be transmitted, with the interposition of the housing and the fastener, to the undercut of the receiving bore. It may be considered disadvantageous that an end wall of the housing, bounded essentially like a circular-annular disk and adjacent to the electrical coil, is deformed in a manner comparable to a diaphragm upon pressure impositions on the valve. As a consequence, undesired relative motions of the guide sleeve with respect to the valve block cannot be precluded, and because of the relative motion, the hydraulic unit equipped in this way breathes and therefore may have problematic elasticity.

OBJECT AND SUMMARY OF THE INVENTION

The definitive characteristics as set forth herein, offer the advantage that by hydraulic imposition on the valve, forces acting upon the guide sleeve in the direction of the atmosphere are transmitted directly to the securing flange. The housing fitting over the electrical coil accordingly remains free of hydraulically produced forces and can therefore, advantageously, be embodied together with the electrical coil as a separate component that can be slipped over the guide sleeve, and the securing flange can be fixed to the valve block without the aid of the housing. This makes the hydraulic unit easier and cheaper to assemble and simplifies the replacement of the electrical coil, which may possibly become necessary if the electrical coil becomes overheated from an electrical defect in an associated control unit.

By the provisions recited herein, advantageous further embodiments of and improvements to the valve disclosed are possible. The features set forth have an advantage that the securing flange can be relatively thin and lightweight. Despite a relatively thin-walled embodiment of the securing flange and bush, it is possible to provide the recess that is essential to the invention. The inventive concept provides an inexpensive option for producing an especially lightweight securing flange sets forth a production method in which an essentially form-locking connection between the guide sleeve and the securing flange with its bush can be produced inexpensively in one operation.

A further advantage is that the guide sleeve, which has a bead, is insertable in a prefabricated state into the opening of the securing flange and the recess that receives the bead and additionally brings about an axial positional securing in a direction opposite the insertion direction.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 is an enlarged detail in longitudinal section of the valve according to the invention as shown in FIG. 1;

FIG. 3 is a simplified longitudinal section of a device for producing the detail of FIG. 2;

DESCRIPTION OF THE PREFERRED EMBODIMENTS

Figure 1:
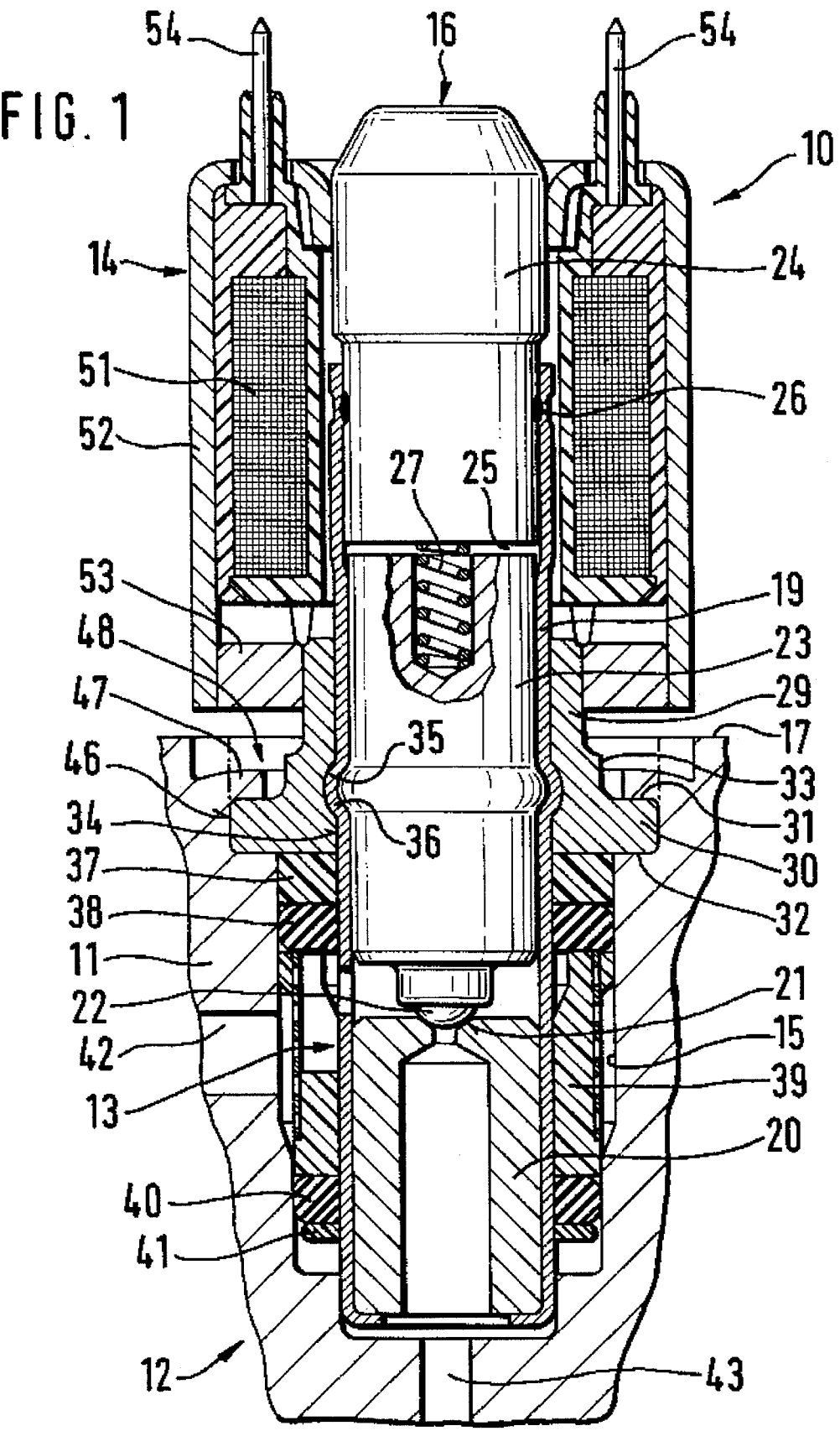
FIG. 1 is a longitudinal section through a first exemplary embodiment of the electromagnetically actuatable valve according to the invention.

An electromagnetically actuatable valve 10, shown as the first exemplary embodiment in FIG. 1, is disposed on a valve block 11 and forms part of a hydraulic unit 12, not otherwise shown, for traction-controlled motor vehicle brake systems. The valve 10 comprises a hydraulic part 13 and an electrical part 14. The hydraulic part 13 is essentially received and secured in a stepped receiving bore 15 of the valve block 11, which is made of a ductile aluminum alloy. In the extension of the receiving bore 15, the hydraulic part 13, with a valve dome 16, protrudes past a boundary plane 17 of the valve block 11. The electrical part 14 is slipped over the valve dome 16.

The hydraulic part 13 has a thin-walled guide sleeve 19 of circular-cylindrical cross section. Beginning at the receiving bore 15, the guide sleeve 19 receives a valve body 20 in a press fit. The valve body 20 has a valve seat 21 for a closing member 22 of an armature 23 that is longitudinally movable in the guide sleeve 19. On the end remote from the valve body 20, the guide sleeve 19 is closed by a magnet core 24, which is part of the valve dome 16. The magnet core 24 engages the guide sleeve 19 fittingly, leaving an air gap 25 toward the armature 23, and is joined to the guide sleeve in a pressure-tight fashion by an encompassing weld 26. The armature 23 receives a closing spring 27 that engages the magnet core 24 and in the position of repose of the valve 10 as shown keeps the closing member 22 in contact with the valve seat 21; hence the valve 10 is closed when without current.

A bush 29 is slipped over the middle region of the sleeve 19, specifically radially outside the magnetically operative armature 23. The wall thickness of the bush 29 is greater than that of the guide sleeve 19 of the valve dome 16. Toward the valve body 20, the bush 29 is provided with a securing flange 30, whose two end faces 31 and 32 extend at a right angle, for instance, to the axis of the receiving bore 15, which at the same time is the longitudinal axis of the valve 10. The bush 29 is of magnetizable material, such as soft magnetic steel. It is joined to the guide sleeve 19, which is of stainless steel. With the interposition of a transitional region 33 between the securing flange 30 and the bush 29, it is possible to embody the bush 29 in lightweight fashion, and in a manner essential to the invention to associate an annular-groove-like recess 35 concentrically with the securing flange 30, beginning at an opening 34, which extends through the bush 29 and the securing flange 30 and through which the guide sleeve 19 extends. Coinciding with this recess 35, the guide sleeve 19 has a radially outwardly oriented bead 36, which extends essentially form-lockingly into the recess 35. Because of the essentially form-locking extension, the guide sleeve 19 is fixed relative to the securing flange 30. The securing flange 30, recess 35 and bead 36 are shown on a larger scale in FIG. 2.

FIG. 3 shows that the bead 36 can be made for instance using a rubber body 55, which is embodied hollow-cylindrically, thrust into the guide sleeve 19, made to coincide with the recess 35, compressed axially by means of two dies 56, 57, and thereby radially expanded, and thereby produces the bead 36 and afterward relaxes, as shown. Naturally the production of the bead 36 may be accomplished in some other way.

Beginning at the securing flange 30, a support ring 37 and a sealing ring 38, which tightly closes off the receiving bore 15 to the outside, are received in that order on the part of the guide sleeve 19 associated with the receiving bore 15. The sealing ring 38 is followed by a filter sleeve 39, a second sealing ring 40, and a support ring 41. The second sealing ring 40 separates pressure fluid lines 42 and 43 of the valve block 11; these lines can be switched open with the valve 10.

The dimensionally rigid securing flange 30 of the bush 29 is received in a bore step 46 of the receiving bore 15. The original contour of the bore step 46 is indicated by dot-dashed lines: the diameter of the bore step is accordingly less than the diameter of the electrical part 14 of the valve 10. The end face 32 toward the valve body of the securing flange 30 rests on the bottom of the bore step 46. Conversely, the other end face 31 of the securing flange 30 is covered by a bead 47 of material, which is attained by a stamping 48 of the material positively displaced by the bore rim. The region on the bore rim of the step 46 acted upon by this stamped connection is likewise located inside the diameter of the electrical part 14. The material bead 47 engages the entire circumference of the securing flange 30 and secures the position of the hydraulic part 13 in the valve block 11. It is capable of reliably dissipating the forces, which become operative inside and outside the hydraulic part 13 and are transmitted to the securing flange 30, to the valve block 11. If the strain is less, then it may be adequate for only segments of the securing flange 30 to be engaged by parts of the material bead 47.

The electrical part 14 of the valve 10 is slipped over the valve dome 16 in the region of the magnetically operative elements, the armature 23 and magnet core 24, after the hydraulic part 13 has been secured in the valve block 11. The electrical part 14 has an electrical coil, which surrounds the valve dome 16 in the region of the magnet core 24. A housing 52 of soft magnetic material fits over the coil 51, and an annular disk 53 likewise of soft magnetic material is press-fitted into its bottom. Connection pins 54 of the coil 51 are formed on the end of the housing 52 remote from the boundary plane 17. The housing 52 of the electrical part 14 advantageously fits without play over the magnet core 24 on the one hand and, with its annular disk 53, the bush 29 of the hydraulic part 13 on the other. When the electrical coil 51 is excited, the bush 29, like the magnet core 24, housing 52 and annular disk 53, contributes to conducting the magnetic flux to the armature 23 of the hydraulic part 13. The magnetically operative magnet core 24 moves the armature 23 to the open position of the valve 10.

Figure 4:
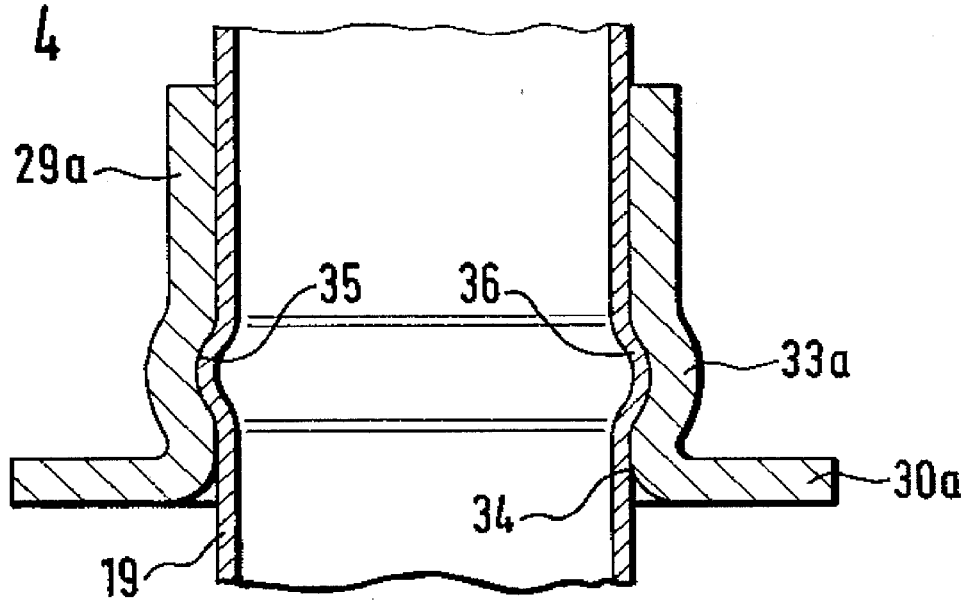
FIG. 4 shows a second exemplary embodiment of a detail for the valve according to the invention, in longitudinal section.

A second exemplary embodiment for a securing flange 30 is shown in FIG. 4. This securing flange 30*a* is embodied as thinner and lighter than the securing flange 30, and together with a bush 29*a*, it is embodied as a deep-drawn part, for instance. The recess 35 of the exemplary embodiment described above for receiving the bead 36 of the guide sleeve 19 is used here as well.

For that purpose, the recess 35 may be formed in a non-material-removing manner, in the form of an additional bead. Producing this bead 36 may be done either after the deep drawing and before the insertion of the guide sleeve 19, or else this bead is made only after the insertion of the guide sleeve 19 into the bush 29*a*, being produced simultaneously with the bead 36 of the guide sleeve 19. A female die, not shown, fitting around the transitional region 33 is used to form the recess 35.

In the exemplary embodiments described in conjunction with FIGS. 1–4, the recesses 35 act as stops in two axial directions. However, if the guide sleeve 19 with its bead 36 together with the magnet core 24 needs to be anchored merely against hydraulic pressure in the valve block 11, then a securing flange 30*b* with a recess 35*b*, which in the manner of a bore step adjoins a borelike opening 34*b* in the bush 29*b*, is sufficient. For this exemplary embodiment of FIG. 5, the bead 36 is produced prior to insertion of the guide sleeve 19 into the securing flange 30*b*.

Figure 6:
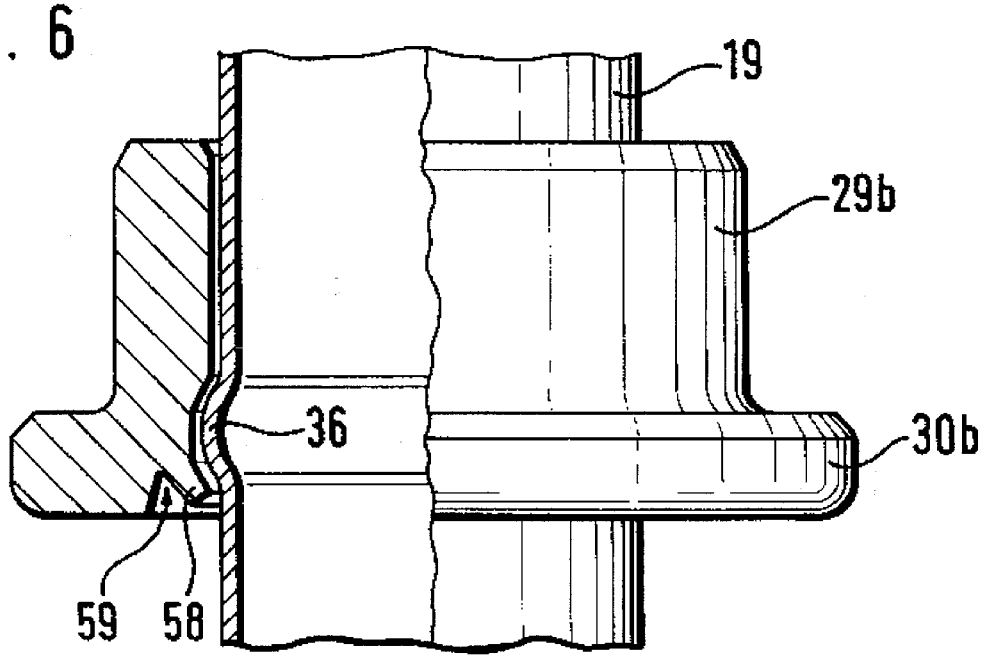
FIG. 6 shows a further feature for the exemplary embodiment of FIG. 5 in fragmentary section.

By comparison, FIG. 6 shows a further feature of a combination of the guide sleeve 19 and securing flange 30*b* by providing a crimp 58 made from the material of the securing flange 30*b*. This crimp 58 can be produced by pressing in a notchlike annular groove 59 into the securing flange 30*b* on the face end. The provision of the crimp 58 fixes the guide sleeve 19 in two axial directions relative to the securing flange 30*b*.

Figure 5:
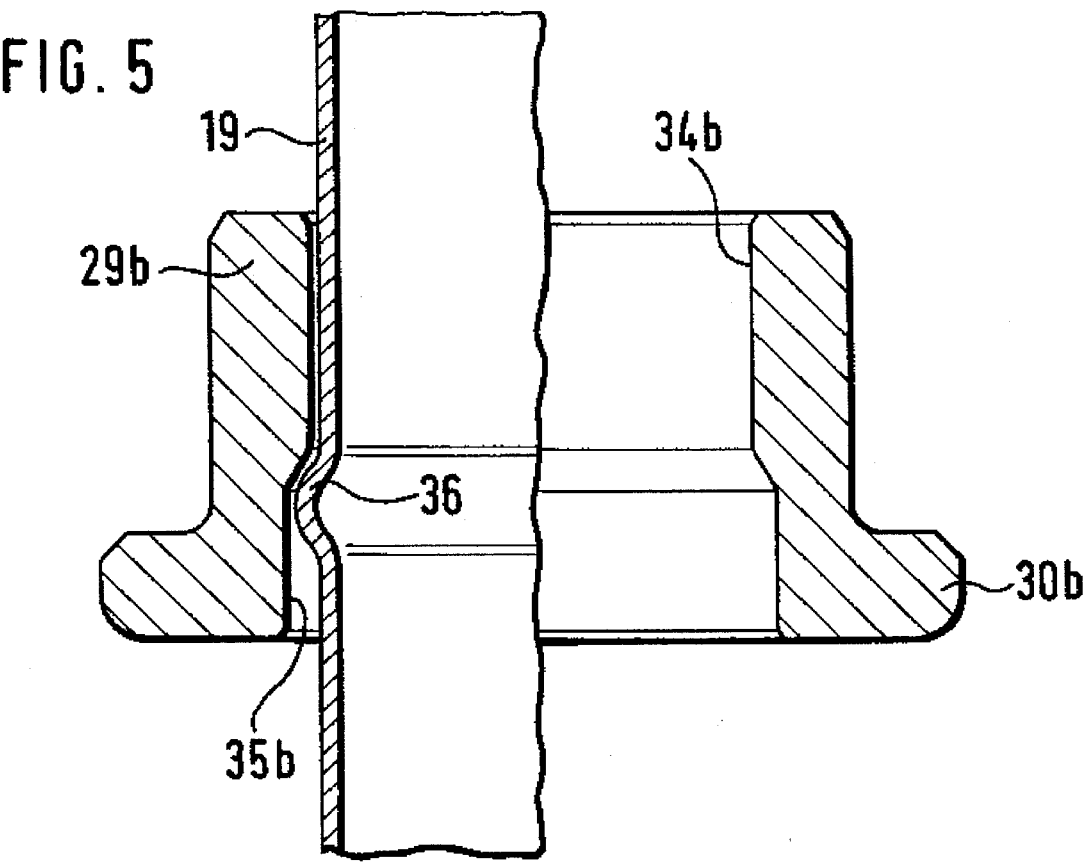
FIG. 5 shows a further exemplary embodiment for such a detail in longitudinal section, for alternative use in the valve according to the invention as shown in FIG. 1.
Figure 7:
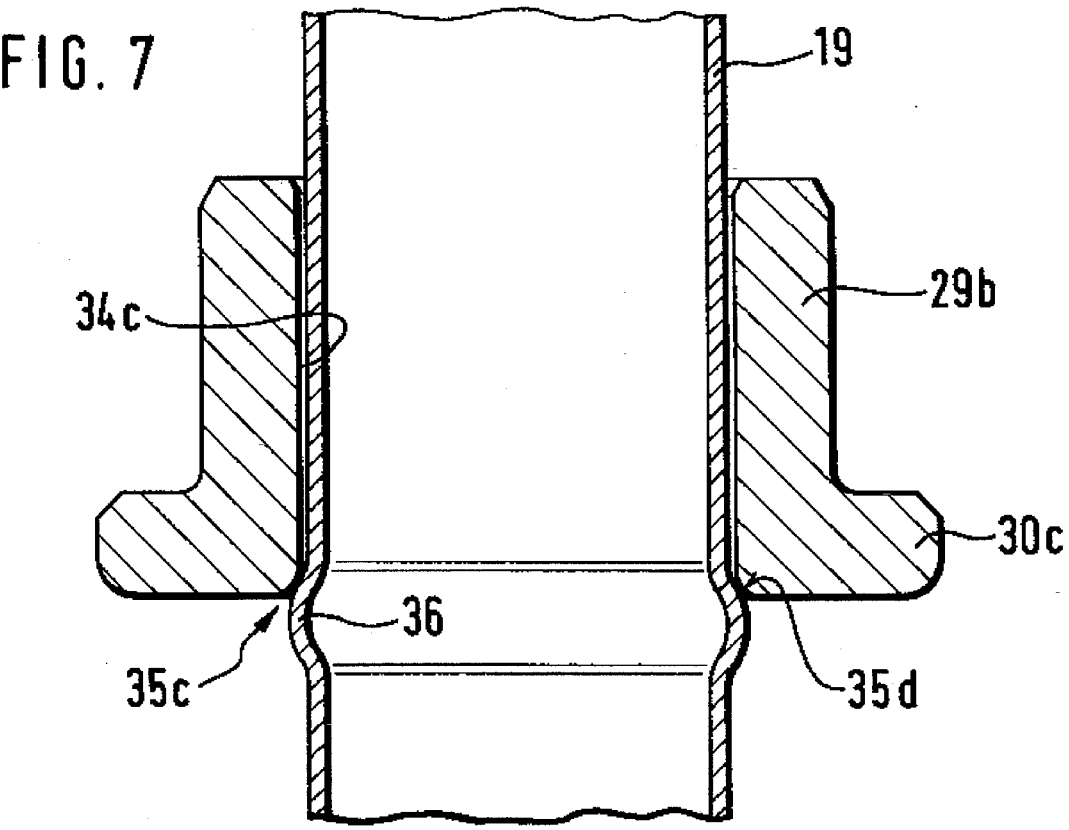
FIG. 7 shows a less expensive exemplary embodiment in longitudinal section.

If the provision of the crimp 58 is omitted, then in a further feature of the exemplary embodiment of FIG. 5, the recess 35*b* may readily be made shorter in the axial direction, in which case the bead 36 protrudes partway out of the securing flange 30*b*. It is also possible, however, to have the bead 36 protrude nearly all the way out of a securing flange 30*c*, as shown in FIG. 7. In this case, a region 35*c* of the securing flange 30*c* that is adjacent to the opening 34*c* serves as an axial stop for the bead 36. To avert damage to the guide sleeve 19, the region 35*c* is provided with a rounded portion 35*d* or a chamfer toward the opening 34*c*.

In the case of a multiple assembly of valves 10 in the course of the boundary plane 17 of the valve block 11, a high packing density is attainable, since the crimp 48 is located inside the diameter of the electrical part 14. Valves 10 can therefore be disposed next to one another with very little space between them.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electromagnetically actuatable valve, for a slip-controlled hydraulic brake system of a motor vehicle, having a guide sleeve, a magnet core and a valve seat which are secured within the guide sleeve, an armature and a closing element which are movable inside the guide sleeve relative to the magnet core and to the valve seat, an electrical coil and a soft magnetic housing fitted over said electrical coil, both of which are disposed outside the guide sleeve, a bush (29, 29a, 29b) includes a securing flange (30, 30a, 30b), said bush is made of a magnetic flux guiding material and has an opening (34, 34b) through which the guide sleeve extends thereby surrounding the guide sleeve with one end extending into an area surrounded by a portion of said soft magnetic housing (52) of the electrical coil (51), the guide sleeve (19) has a radially outward-oriented encompassing bead (36), which is received substantially form-lockingly inside a recess (35, 35b) that is concentrically associated with the opening (34, 34b) of the bush and that has a larger diameter than the opening (34, 34b).

2. An electromagnetically actuatable valve as defined by claim 1, in which the recess (35) is formed in the manner of an annular groove in a transitional region (33) from the securing flange (30) to thee bush (29).

3. An electromagnetically actuatable valve as defined by claim 2, in which the securing flange (30a) and the bush (29a) connected via the transitional region (33a) are embodied as a part deep-drawn from sheet metal, and that the recess (35) is located inside an additional bead that is formed into the deep-drawn part.

4. An electromagnetically actuatable valve as defined by claim 3, in which the bead (36) of the guide sleeve (19) and the recess (35) adjacent to the bush (29) are produced simultaneously.

5. An electromagnetically actuatable valve as defined by claim 1, in which the opening (34b) is shifted into the bush (29b), and that the region is embodied as the recess (35b) in the manner of a bore step extending through the securing flange (30b).

6. An electromagnetically actuatable valve as defined by claim 5, in which beginning at the securing flange (30b), a stamping (58) comprising the material thereof is oriented toward the bead (36) of the guide sleeve (19).

* * * * *